G. S. OGILVIE.
WHEEL FOR ROAD VEHICLES.
APPLICATION FILED JUNE 28, 1907.
934,341.
Patented Sept. 14, 1909.
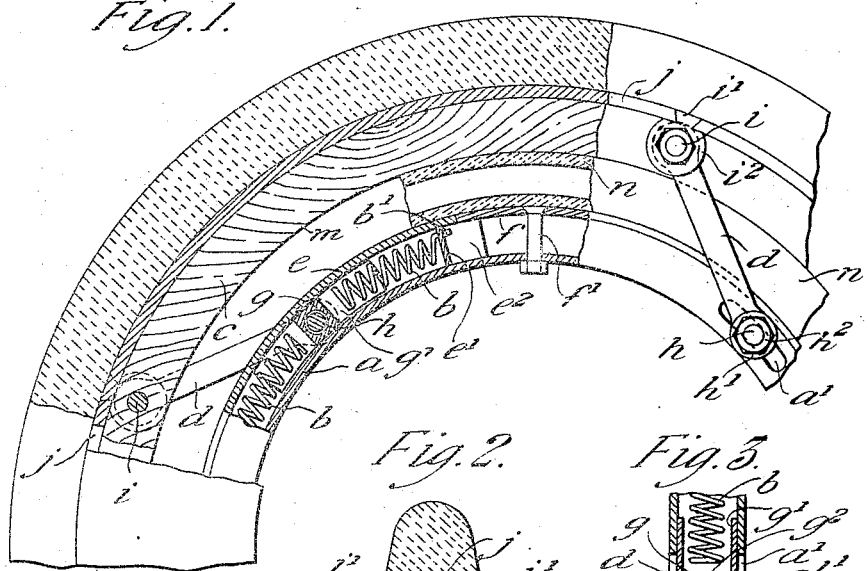
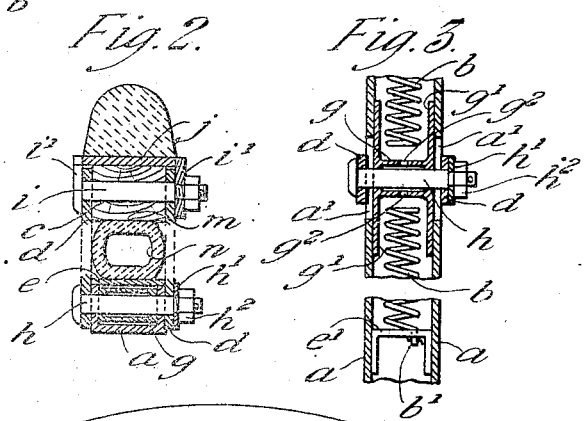
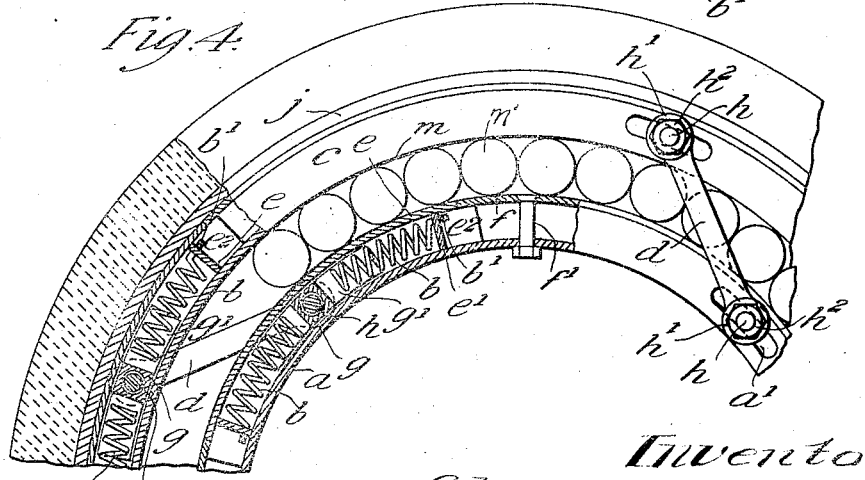
Inventor
Glencairn S. Ogilvie
By
James L. Norris
Atty.

UNITED STATES PATENT OFFICE.

GLENCAIRN STUART OGILVIE, OF WOODBRIDGE, ENGLAND.

WHEEL FOR ROAD-VEHICLES.

934,341.  Specification of Letters Patent.  Patented Sept. 14, 1909.

Application filed June 28, 1907. Serial No. 381,341.

*To all whom it may concern:*

Be it known that I, GLENCAIRN STUART OGILVIE, a subject of the King of Great Britain, residing at The Lodge, Woodbridge, in the county of Suffolk, England, have invented certain new and useful Improvements in Wheels for Road-Vehicles, of which the following is a specification.

This invention relates to an improved construction of spring wheels for road vehicles having floating rims supported on a resilient medium such as elastic tubes filled with compressed air or some elastic material, india rubber, or other elastic rollers, or other equivalent, interposed between the rim and felly.

According to this invention the rim and felly members are correlated by a series of rigid links, preferably arranged in pairs, each in pivotal engagement with one wheel member and pivotally connected with a block or shoe slidably mounted, with limited circumferential movement on the periphery of the other member.

The initial impact and torque, for either direction of relative movement of the two members, is taken by and transmitted through buffer springs or other equivalent cushions engaged directly or indirectly by the sliding shoe or block which is moreover preferably arranged to have a circumferential movement of limited extent before the buffer springs come into action.

The shoes may be mounted on either wheel member or the driving links may even be pivoted at both ends to such shoes or blocks mounted to slide circumferentially on the rim and felly members respectively, but a convenient construction is shown, by way of example, in the accompanying drawings, in which:

Figure 1 is an elevation partly in section and with parts removed, of a portion of a wheel embodying one form of the present invention, having an elastic tube as a resilient supporting medium. Fig. 2 is a transverse section of the floating rim and fixed felly through the driving link pivots in Fig. 1. Fig. 3 is a sectional plan view of part of the fixed felly through the felly pivot of the driving links, and Fig. 4 is a view similar to Fig. 1 of a modified form showing elastic rollers as a resilient supporting medium and the driving links pivoted at both ends to shoes mounted to slide circumferentially on the rim and felly members respectively.

The member, or members, that carries the slidable blocks, and which may be either the felly $a$ or rim $c$, or as shown in Fig. 4 both the felly and the rim, is as shown in Fig. 2, of channel iron for the accommodation of buffer spring $b$ and is correlated with the other wheel member $c$ by driving links $d$ which are in pivotal engagement at their ends with the felly and rim respectively. As shown in the drawings, the outer ends of each pair of buffer springs are detachably secured by cotters $b'$ to buffing plates $e'$ depending from and attached to removable plates or covers $e$, which plates and covers serve also to inclose completely the space in which the buffer springs operate and which is usually filled with a suitable lubricant. The buffing plates $e'$ have lateral extensions $e^2$ projecting under cover plates $f$ which form extensions of and abutments for the removable cover plates $e$; the plates $f$ are secured to the fixed felly by countersunk bolts $f'$ and retain the movable covers $e$ in position.

Between the free ends of each pair of buffer springs $b$ is a sliding block or shoe $g$ fitting freely between the sides of the channel bar felly $a$ and having laterally extending cheeks $g'$ which slide over and close the circumferential slots $a'$ in the sides of the felly through which projects the felly bolt $h$ which constitutes the felly pivot of the driving links $d$. The bolt $h$ which passes centrally through the shoe $g$, is shouldered at $h'$ to prevent binding of the driving links $d$ when the nut $h^2$ is screwed home. The wall of the shoe $g$ are perforated at $g^2$ to provide access to the bolt bearings of the lubricating grease which fills the spring chambers and which is automatically pumped into the bolt bearings by the action of the sliding shoe in running.

The space between the inner ends of the buffer spring $b$ is greater than the thickness from front to rear of the shoe $g$, so that when the wheel is unloaded and at rest there will be certain clearness on each side of the shoe thus providing for a certain amount of free relative circumferential movement of the felly and rim before the springs $b$ come into action. It is to be understood that when the term "limited free circumferential movement" is used hereinafter it is meant to signify such free relative movement as may be allowed by the employment of the form of construction just referred to.

The pivot bolts $i$ for connecting the driving links to a wheel member that does not carry the blocks $g$ are preferably formed with a chamfered or dovetailed projection $i'$ on the bolt head which takes into a similarly shaped notch in the edge of the iron felly band $j$ of the floating rim when the rim is so provided, and the washer $i^2$ is similarly formed and similarly bedded in the band $j$. The bolts $i$ are also shouldered to prevent binding of the driving links $d$ when the nuts are screwed home.

In Fig. 1 the wheel rim $c$ is shown as solid, but in Fig. 4 the rim and its contained parts are shown constructed similarly to the felly $b$ as described above, corresponding parts being similarly lettered, and the driving links $d$ each connected with two shoes or blocks which are mounted respectively on the two wheel members.

In Fig. 4 the resilient supporting medium comprises a series of elastic rollers $n'$.

The driving links are preferably inclined to the radius of the wheel with the end of the link connected with the driving member in advance of the other end. Thus the wheel in Fig. 1 would be a driving wheel for clockwise rotation and a trailing wheel for counter-clockwise rotation.

The springs $b$ are of such strength as to absorb efficiently all shocks of transmission whether from the wheel to the engine or conversely, such for example as might be thrown on the gearing by the wheels encountering obstacles on the road, or caused by the arrest of momentum due to the sudden application of the brakes, or by the abnormal resistance on starting due to inertia. The gradual application of the driving torque on starting and of the retarding force on the application of the brakes, due to the interposition of the buffer springs, also reduce very materially the excessive attrition to which the wheel tread is subject on starting or suddenly stopping the vehicle.

Under normal conditions the driving elements, comprising the shoes $g$ and bolts $h$, do not reach the limiting positions determined by the slots $a'$, and should they do so under abnormal conditions the springs $b$ prevent any undue shock of engagement between the bolts $h$ and the ends of the slots.

The number of driving links and sets of springs may be varied to suit various kinds of wheels and vehicles, but for ordinary purposes four pairs of links equally spaced around the wheel is a convenient arrangement.

The resilient medium that supports the floating rim may consist of elastic tubes filled with compressed air or some elastic material, india rubber or other elastic rollers, or other equivalent, and in the drawing in Figs. 1 and 2 it is shown as a continuous pneumatic tube $n$ interposed between the outer periphery of the felly and the inner periphery $m$ of the floating rim; but in Fig. 4 the resilient medium is represented by elastic rollers.

Having thus described the nature of my invention and the best means I know of carrying the same into practical effect, what I claim is:

1. In resilient wheels of the character herein referred to, a floating rim member and a fixed felly member, a resilient support interposed between said members, blocks separate from said support, carried by and slidably mounted with limited free relative circumferential movement on one member and a series of rigid links each pivotally connected with one of said blocks and in pivotal engagement with the other member, substantially as described.

2. In resilient wheels of the character herein referred to, a floating rim member and a fixed felly member, a resilient support interposed between said members, blocks separate from said support, carried by and slidably mounted with limited free relative circumferential movement on the respective wheel members, and a series of rigid links each connecting two blocks which are mounted respectively on the two wheel members, substantially as described.

3. In resilient wheels of the character herein referred to, a floating rim member and a fixed felly member, a resilient support interposed between said members, blocks separate from said support, carried by and slidably mounted with limited free relative circumferential movement on one of said members, the said wheel member having slots, a series of pivot bolts carried by said blocks and adapted to slide in said slots, a series of rigid links each pivotally connected with one of said bolts and in pivotal engagement with the second wheel member, and buffer springs normally out of engagement with said sliding blocks when the wheels are unloaded, said springs being adapted to coöperate with the sliding blocks to reduce the shock of engagement of the pivot bolts with the slots and provide for limited free relative circumferential movement of the wheel members, substantially as described.

4. In resilient wheels of the character herein referred to, a floating rim member and a fixed felly member, a resilient support interposed between said members, blocks separate from said support, carried by and slidably mounted with limited free relative circumferential movement on the respective wheel members, the wheel members having slots, a series of pivot bolts carried by said blocks and adapted to slide in said slots, a series of rigid links each connecting two blocks which are mounted respectively on the two wheel members, and buffer springs normally out of engagement with said sliding blocks when the wheels are unloaded, said springs being adapted to coöperate with the sliding blocks to reduce the shock of engagement of the pivot bolts with the slots and provide for limited free relative circumferential movement of the wheel members, substantially as described.

5. In resilient wheels of the character referred to, a floating rim member and a fixed felly member, a resilient support interposed between said members, separate from said support, blocks carried by and slidably mounted on one of the wheel members with limited free relative circumferential movement, the said wheel member having slots, a series of pivot bolts carried by said blocks and adapted to slide in said slots, a series of rigid links each pivotally connected with one of said bolts and in pivotal engagement with the second wheel member, buffer springs normally out of engagement with said sliding blocks when the wheels are unloaded, said springs being adapted to coöperate with the sliding blocks to reduce the shock of engagement of the pivot bolts with the slots and provide for limited free relative circumferential movement of the wheel members, and the first said wheel member being constructed of channel iron for the accommodation of said buffer springs, substantially as described.

6. In resilient wheels of the character referred to, a floating rim member and a fixed felly member, a resilient support interposed between said members, blocks separate from said support, carried by and slidably mounted on one of the wheel members with limited free relative circumferential movement, the said wheel member having slots, a series of pivot bolts carried by said blocks and adapted to slide in said slots, a series of rigid links each pivotally connected with one of said bolts and in pivotal engagement with the second wheel member, buffer springs normally out of engagement with said sliding blocks when the wheels are unloaded, said springs being adapted to coöperate with the sliding blocks to reduce the shock of engagement of the pivot bolts with the slots and provide for limited free relative circumferential movement of the wheel members, said first wheel member being constructed of channel iron for the accommodation of said buffer springs, the first wheel member having compartments adapted to retain said sliding blocks and buffer springs, and said blocks having perforations adapted to admit lubricating material to the interior thereof during the running of the wheel, substantially as described.

7. In resilient wheels of the character herein referred to, a floating rim member and a fixed felly member, a resilient support interposed between said members, blocks separate from said support, carried by and slidably mounted with limited free relative circumferential movement on the respective wheel members, the wheel members having slots, a series of pivot bolts carried by said blocks and adapted to slide in said slots, a series of rigid links each connecting two blocks which are mounted respectively on the two wheel members, and buffer springs normally out of engagement with said sliding blocks when the wheels are unloaded, said springs being adapted to coöperate with the sliding blocks to reduce the shock of engagement of the pivot bolts with the slots and provide for limited free relative circumferential movement of the wheel members, the said wheel members being constructed of channel iron for the accommodation of said springs, substantially as described.

8. In resilient wheels of the character herein referred to, a floating rim member and fixed felly member, a resilient support interposed between said members, blocks separate from said support, carried by and slidably mounted with limited free relative circumferential movement on the respective wheel members, the wheel members having slots, a series of pivot bolts carried by said blocks and adapted to slide in said slots, a series of rigid links each connecting two blocks which are mounted respectively on the two wheel members, buffer springs normally out of engagement with said sliding blocks when the weels are unloaded, said springs being adapted to coöperate with the sliding blocks to reduce the shock of engagement of the pivot bolts with the slots and provide for limited free relative circumferential movement of the wheel members, the said wheel members being constructed of channel iron for the accommodation of said springs, and said blocks having perforations adapted to admit lubricating material to the interior thereof during the running of the wheel, substantially as described.

In testimony whereof I have signed my name to this specification in the presence of two subscribing witnesses.

GLENCAIRN STUART OGILVI'

Witnesses:
 JOSEPH MILLARD,
 GEORGE I. BRIDGES.